US006774937B1

(12) United States Patent
Kobayashi

(10) Patent No.: US 6,774,937 B1
(45) Date of Patent: Aug. 10, 2004

(54) IMAGE PROCESSING SYSTEM AND CAMERA SYSTEM

(75) Inventor: Atsushi Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/356,876

(22) Filed: Jul. 19, 1999

(30) Foreign Application Priority Data

Jul. 21, 1998 (JP) .......................................... 10-204574

(51) Int. Cl.⁷ .................. H04N 5/228; H04N 9/68; H04N 7/12; H04N 5/21; H04N 9/78; H04B 1/66
(52) U.S. Cl. ................ 348/222.1; 348/235; 348/397.1; 348/608; 348/627; 348/666; 375/240; 382/242; 358/448
(58) Field of Search .................. 348/384, 396.1–398.1, 348/222.1, 234, 235, 608, 627, 666, 609, 610, 625, 613, 709; 375/240, 240.01, 240.1, 240.11, 240.12, 240.29, 240.08; 382/242; 358/448

(56) References Cited

U.S. PATENT DOCUMENTS

| | | | | |
|---|---|---|---|---|
| 5,285,267 A | * | 2/1994 | Lim | 348/26 |
| 5,835,237 A | * | 11/1998 | Ebrahimi | 382/266 |
| 6,148,116 A | * | 11/2000 | Park et al. | 348/623 |
| 6,346,999 B1 | * | 2/2002 | Udagawa et al. | 348/234 |
| 6,477,279 B2 | * | 11/2002 | Go | 375/240.19 |

* cited by examiner

*Primary Examiner*—Andrew Christensen
*Assistant Examiner*—Nhan Tran
(74) *Attorney, Agent, or Firm*—Frommer Lawrence & Haug LLP; William S. Frommer

(57) ABSTRACT

In the case where an output signal of an image pickup device is compressed and is transmitted through a transmission path with band limitation, when a conventional compression and expansion technique is directly applied, there is a lot of waste and a circuit scale becomes large, so that the cost of the system is raised. In an image processing system or a camera system of the invention in which an output signal of an image pickup device is compressed and is transmitted, the output signal of the image pickup device is made to pass through a luminance signal forming portion and a contour correcting signal forming portion, so that the signal is divided into a luminance signal and a contour correcting signal. These signals are separately compressed by compression processing portions, and multiplexed by a multiplexing portion, and then transmitted through a transmission path with band limitation such as a USB.

7 Claims, 3 Drawing Sheets

※ EXAMPLES OF CHARACTERISTICS OF FILTERS ARE SHOWN IN BRACKETS.
HOWEVER, A SHIFT OF DELAY FOR EACH PATH IS NOT TAKEN INTO CONSIDERATION.

IMAGE PROCESSING SYSTEM AND CAMERA SYSTEM

BACKGROUND OF THE INVENTION

1. Field of the Invention

The present invention relates to an image processing system and a camera system, and particularly to an image processing system which compresses an image, transmits it, and expands it, and a camera system which compresses a picked up image and transmits it.

2. Description of the Related Art

In the case where a system with band limitation, for example, a USB (Universal Serial Bus) used for a personal computer or the like is considered as a transmission path of an image, according to the standard specification of the USB, the maximum transfer rate in the case where operation is made at full speed (12 MHz) and isochronous transfer is used, is 1.023 Mbyte/sec (=1,023 bytes×1,000 frames/sec).

On the other hand, in the case where a normal CIF (Common Intermediate Format) size (358 horizontal pixels× 288 vertical pixels) is transferred in conformity with YUV of 4:2:2 at a frame rate of 30 fps (frame per second), a transfer width of 6.19 Mbyte/sec is necessary, and even in the case where YUV of 4:2:0 is adopted, a transfer width becomes 4.64 Mbyte/sec. Thus, it is necessary to make transmission after the image is compressed to at least about ¼.

In such an image processing system that an original image exists, compression processing is made to the image, transmission is made, and then, the compressed image is expanded so that the original image is restored, it is important that the difference between the image before the compression processing and the image after the expansion processing is small. Thus, conventionally, compression/expansion processing has been made by using DCT (Discrete Cosine Transform) coding, sub-band coding, wavelet coding, or the like.

On the other hand, in the case of an image processing system in which an image picked up by an image pickup device typified by a CCD (Charge Coupled Device) image sensor is compressed and transmitted, and this is expanded and is shown on, for example, a display of a personal computer, it is not necessary to show the image before the compression processing, and it is not necessary to cause the final image after the expansion processing to approach the state before the compression. That is, if the image after the expansion processing is adequate in picture quality, there is no problem.

Thus, with respect to the signal processing before the compression, it is satisfactory if optimum processing is carried out with a view to the compression. To such an image processing system, if a compression/expansion technique used for the foregoing image processing system in which the picture quality of an image before compression processing is required to be adequate and the picture quality after expansion processing is also required to be the same, is directly applied, there is a lot of waste and a circuit scale becomes large, so that the cost of the system is raised.

SUMMARY OF THE INVENTION

The present invention has been made in view of the above problem, and an object of the invention is to provide an image processing system and a camera system in each of which a circuit scale can be reduced and a lower cost system can be realized.

An image processing system of the present invention comprises coding means for dividing an output signal of an image pickup device with a color filter into a luminance signal and a contour correcting signal and for separately compressing and outputting these signals, a transmission path with band limitation for transmitting the luminance signal and the contour correcting signal compressed by the coding means, and decoding means for separately expanding the luminance signal and the contour correcting signal transmitted through the transmission path and for adding and outputting these signals.

In the image processing system of the above structure, the coding means uses a signal in a process of carrying out signal processing of the output signal of the image pickup device to divide the output signal into the luminance signal and the contour correcting signal, and separately compresses them. The compressed luminance signal and contour correcting signal are transmitted through the transmission path with band limitation. The decoding means separately expands the luminance signal and the contour correcting signal transmitted through the transmission path, and then, adds and outputs them.

A camera system of the present invention comprises an image pickup device with a color filter, an optical system for taking in incident light from an object and for causing imaging on an image pickup surface of the image pickup device, and coding means for dividing an output signal of the image pickup device into a luminance signal and a contour correcting signal and for separately compressing and outputting these signals.

In the camera system of the above structure, the image pickup device carries out photoelectric conversion in a pixel unit on the basis of image light of the object taken in by the optical system, and outputs pixel information as an image pickup signal. Receiving the image pickup signal, the coding means uses a signal in a process of carrying out signal processing to divide the image pickup signal into the luminance signal and the contour correcting signal, and separately compresses and outputs them.

DETAILED DESCRIPTION OF THE PREFERRED EMBODIMENTS

Preferred embodiments of the present invention will now be described in detail with reference to the drawings.

Figure 1:
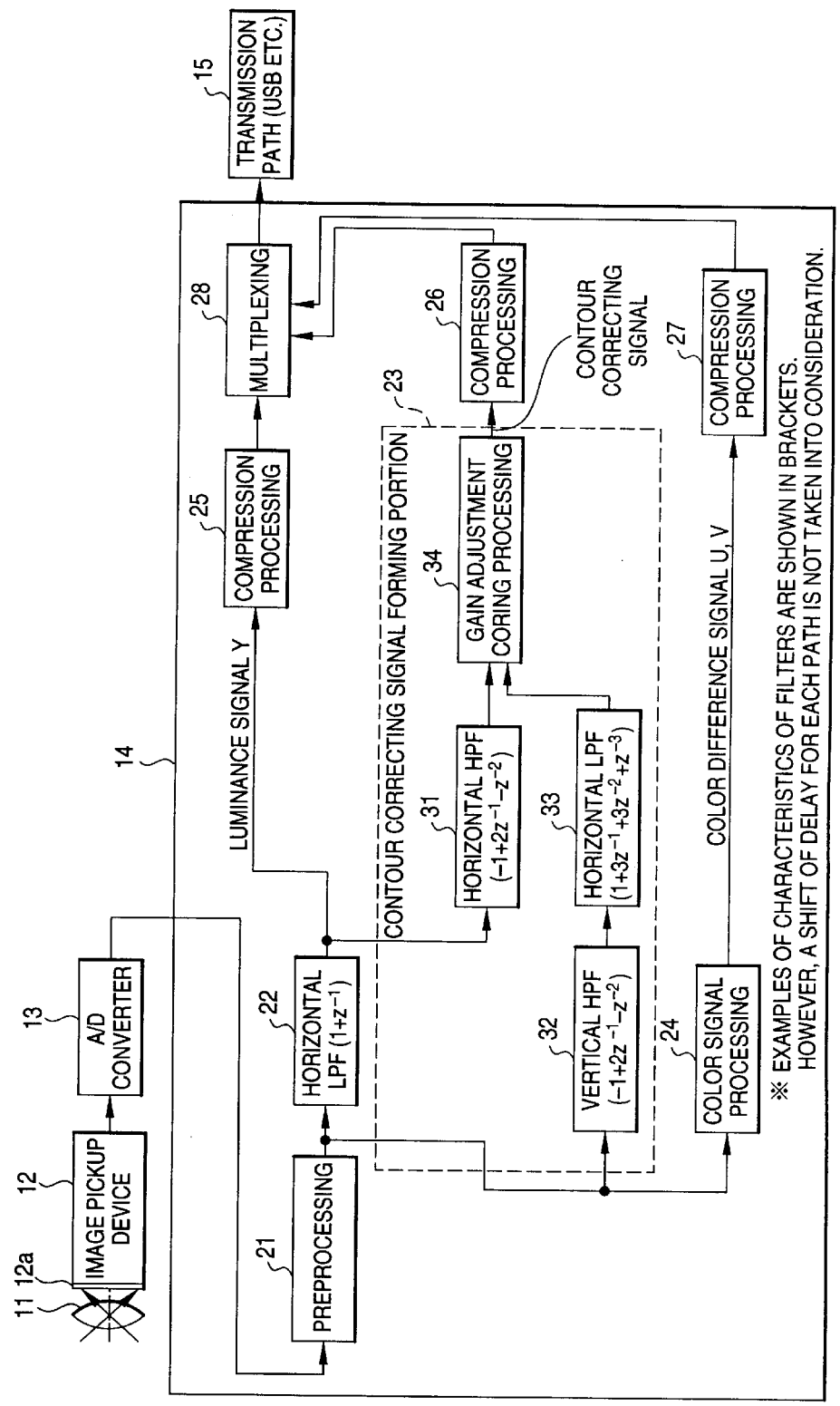
FIG. 1 is a block diagram showing a structure of a camera system according to an embodiment of the invention.

FIG. 1 is a block diagram showing a structure of a camera system according to an embodiment of the invention. A camera system 10 of this embodiment comprises a lens 11, an image pickup device 12, an A/D converter 13, and a coding block 14. An image signal coded (compressed) by the coding block 14 is transmitted through a transmission path 15 with band limitation such as a USB to a host side, for example, a personal computer.

The lens 11 constitutes a part of an optical system, and takes in incident light (image light) from an object (not shown) to cause imaging on the image pickup surface of the image pickup device 12. As this image pickup device 12, for example, a CCD image sensor with a color filter 12a of a complementary color checkered arrangement is used. The image pickup device 12 converts incident light into a signal charge corresponding to the light amount in a pixel unit, and outputs the pixel information as an image pickup signal.

The A/D converter 13 digitizes the image pickup signal (image signal) outputted from the image pickup device 12 and supplies it to the coding block 14. Although not shown in the drawing, before the A/D conversion is carried out, signal processing is carried out at the preceding stage so that a suitable waveform is obtained through a sample-and-hold circuit, a preliminary amplifier, or the like, and then, the A/D conversion is carried out.

In the coding block 14, the image signal inputted from the A/D converter 13 is subjected to processing such as black level clamping or defect correction by a preprocessing portion 21, and then, the processed signal is supplied to a luminance signal forming portion 22, a contour correcting signal forming portion 23, and a color signal processing portion 24. The luminance signal forming portion 22 is constituted by a simple horizontal LPF (Low Pass Filter), and the image signal inputted from the preprocessing portion 21 is made to pass through this horizontal LPF so that the luminance signal Y is formed.

The contour correcting signal forming portion 23 is constituted by a horizontal HPF (High Pass Filter) 31, a vertical HPF 32, a horizontal LPF 33, and a gain adjustment coring processing portion 34. In this contour correcting signal forming portion 23, an image signal obtained by causing the luminance signal formed by the luminance signal forming portion 22 to pass through the horizontal HPF 31 is made a contour correcting signal in the horizontal direction. Besides, a signal obtained by causing a signal inputted from the preprocessing portion 21 to pass through the vertical HPF 32 and further to pass through the horizontal LPF 33 is made a contour correcting signal in the vertical direction.

Figure 2:
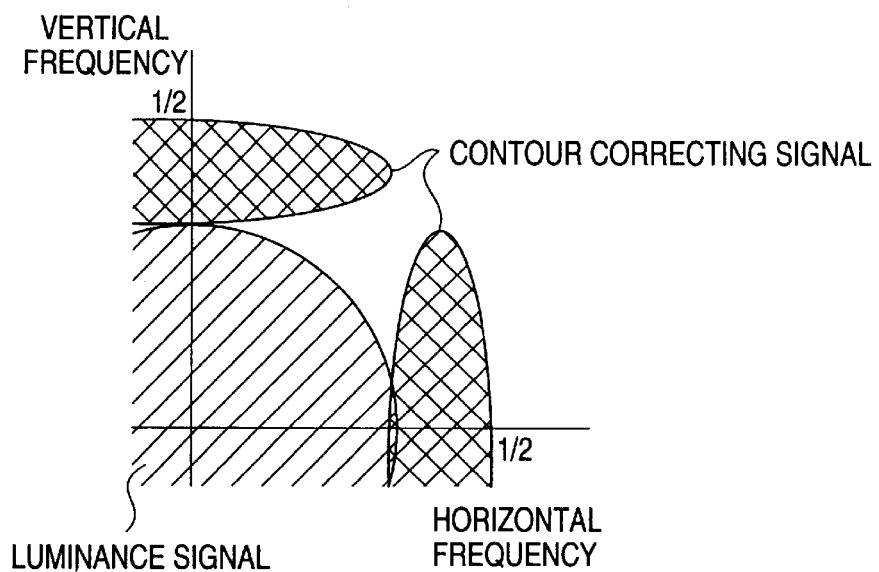
FIG. 2 is a conceptual view showing passing bands of a luminance signal and a contour correcting signal.
Figure 3:
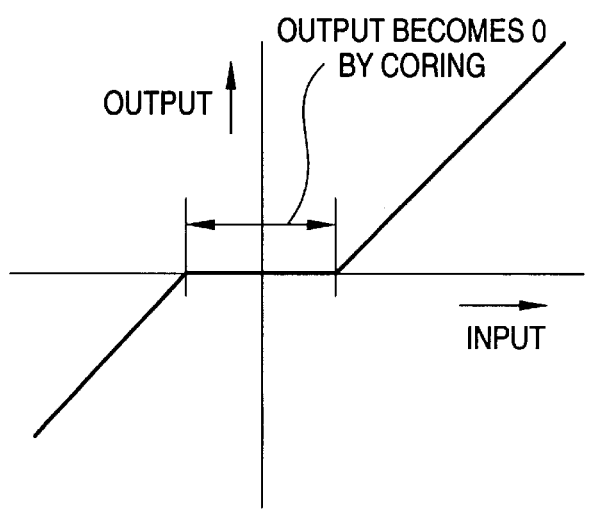
FIG. 3 is a view showing an example of input/output characteristics of coring processing.

FIG. 2 shows a distribution of passing bands of the luminance signal and the contour correcting signal in a frequency region. Both the horizontal frequency and vertical frequency are normalized with a sampling frequency being made Subsequently, in the gain adjustment coring processing portion 34, after the horizontal contour correcting signal and the vertical contour correcting signal are respectively multiplied by a suitable gain and are added, processing called coring is carried out to form the contour correcting signal. Here, the coring processing is such processing that a signal with a small absolute value is made to be prohibited from passing. FIG. 3 shows input/output characteristics of the coring processing.

The color signal processing circuit 24 performs various signal processings to the signal inputted from the preprocessing portion 21, and finally outputs two color difference signals U and V. The luminance signal Y, the contour correcting signal, and the color difference signals U and V formed in this way are separately compressed (coded) by compression processing portions 25, 26 and 27, and then, the signals are multiplexed in a multiplexing portion 28 and are sent to the transmission path 15 such as a USB.

Incidentally, in the coding block 14 of the foregoing structure, expressions in the brackets of the horizontal LPF 22, the horizontal HPF 31, the vertical HPF 32, and the horizontal LPF 33 show examples of characteristics of the filters. However, a shift of delay for each path is not taken into consideration.

As described above, the coding block 14 of this embodiment adopts such a system that when coding processing of the image signal is carried out, the coding processing is separately carried out for the luminance signal and the contour correcting signal. This processing system is a system similar to band division by subband coding.

That is, in the band division by the subband coding, an image is divided into a high frequency component and a low frequency component in each of the horizontal direction and vertical direction by using a filter, so that four images (horizontal low frequency/vertical low frequency, horizontal high frequency/vertical low frequency, horizontal low frequency/vertical high frequency, and horizontal high frequency/vertical high frequency) are made. On the other hand, in the coding block 14 of the foregoing structure, the luminance signal corresponds to the image of horizontal low frequency/vertical low frequency, and the contour correcting signal corresponds to a mixture of the image of horizontal high frequency/vertical low frequency and the image of horizontal low frequency/vertical high frequency.

In a conventional compression processing using the subband coding, after a luminance signal subjected to contour correcting is formed in a signal processing system of an output signal of the image pickup device 12, compression (coding) processing is performed to this luminance signal, so that a filter for dividing a band becomes necessary. Thus, a circuit scale becomes large.

On the other hand, in the coding block 14 of this embodiment, since such a structure is adopted that coding (compression) processing is carried out by using a signal in a process of carrying out signal processing to an image pickup signal of the image pickup device 12, a filter for band division becomes unnecessary, so that the circuit scale can be reduced by that.

Besides, since a signal which has been subjected to coring processing is used as the high frequency signal which is the contour correcting signal, a signal with a small signal level in the high frequency signal becomes 0. Thus, the signal is 0 in the region except the contour of the image, which is suitable for coding, and highly efficient coding can be realized in the compression processing portion 26 to the contour correcting signal.

Incidentally, as a feature of the contour correcting signal, there is a characteristic that pixels having almost the same level and being different in polarity exist in the neighborhood. Thus, by using this characteristic, the following structure can be adopted as the compression processing portion 26 to the contour correcting signal.

Figure 4:
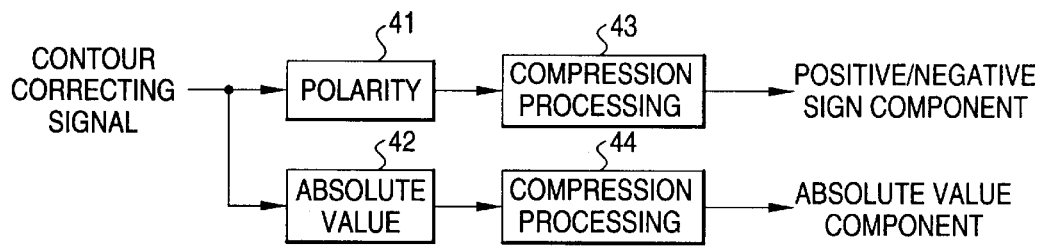
FIG. 4 is a block diagram showing an example of a specific structure of a compression processing portion of a contour correcting signal.

That is, as shown in FIG. 4, the structure is such that the high frequency signal is made to pass through a polarity detecting portion 41 and an absolute value detecting portion 42 to divide it into a positive/negative sign component and an absolute value component, and only the positive/negative sign component and the absolute value component are compressed by compression processing portions 43 and 44. Thus, by adopting the structure that only the positive/negative sign component and the absolute value component are compressed and transmitted, coding with further high efficiency can be realized.

Figure 5:
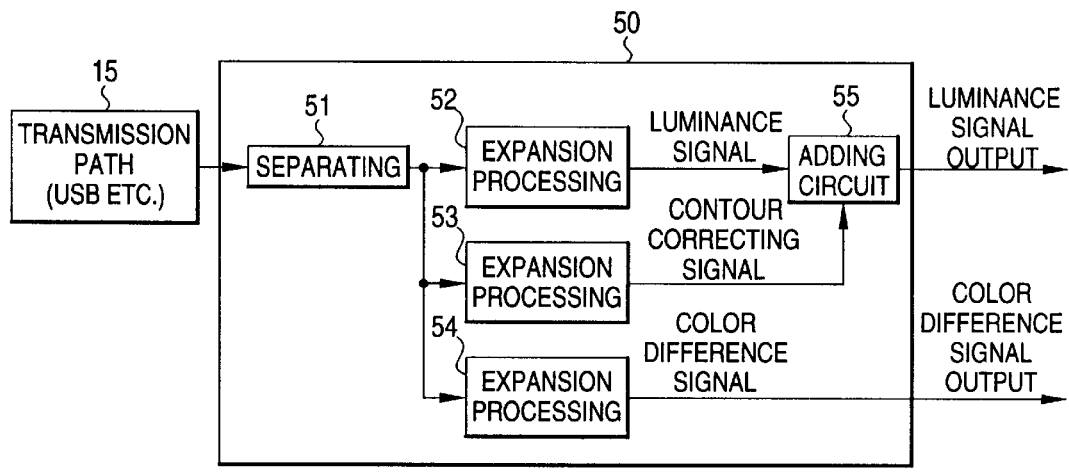
FIG. 5 is a block diagram showing a structure of a decoding block as an input stage of a host side.

FIG. 5 shows an example of a structure of an input stage at a host side, for example, a personal computer as a destination of transmission of the image signal coded (compressed) by the coding block 14. The image signal compressed by the coding block 14 is transmitted to the host side through the transmission path 15 with band limitation such as a USB.

In FIG. 5, the input stage at the host side is constituted by a decoding block 50. In this decoding block 50, the compressed image signal transmitted through the transmission path 15 is divided by the separation portion 51 into signals corresponding to the luminance signal, the contour correcting signal, and the color difference signal, respectively. After the signals are subjected to expansion (decoding) processing corresponding to each signal by expansion processing portions 52, 53, and 54, the luminance signal is added to the contour correcting signal by an adder 55 and is outputted, while the color difference signal is outputted as it is.

The luminance signal and the color difference signal in which the contour correction has been carried out are subjected to various signal processings at a later stage signal processing circuit (not shown), and then, the signals are supplied to a display, a printer, or the like, so that representation, recording, or the like is carried out.

Incidentally, the respective functions of the separating portion 51, the expansion processing portions 52, 53 and 54, and the adder 55 of the decoding block 50 are executed through software of the personal computer.

By the decoding block 50 of the above structure and the foregoing coding block 14, the image processing system of the present invention, that is, the image processing system in which an image picked up by the image pickup device 12 such as a CCD image sensor is compressed by the coding block 14, is transmitted to the host side through the transmission path 15 with band limitation such as a USB, and this is expanded by the decoding block 50, is structured.

As described above, in the image processing system of the present invention, an output signal of the image pickup device with a color filter is divided into a luminance signal and a contour correcting signal, these are separately compressed and are transmitted through the transmission path with band limitation, the transmitted luminance signal and contour correcting signal are separately expanded, and these are added to each other. Thus, the separation of the luminance signal and the contour correcting signal can be made by using a signal in a process of carrying out signal processing of the output signal of the image pickup device, so that a circuit scale can be reduced, and a lower cost system can be realized.

Besides, in the camera system of the present invention, an output signal of the image pickup device with a color filter is divided into a luminance signal and a contour correcting signal, and these are separately compressed and are transmitted. Thus, the separation of the luminance signal and the contour correcting signal can be made by using a signal in a process of carrying out signal processing of the output signal of the image pickup device, so that a circuit scale can be reduced, and a lower cost system can be realized.

What is claimed is:

1. An image processing system, comprising:

coding means for separating a signal provided by an image pickup device with a color filter into a luminance signal and a contour correcting signal, said coding means including:

a horizontal low pass filter to provide said luminance signal, a first filter operable on said luminance signal to provide a horizontal direction contour correcting signal, a second filter operable on the signal derived from said image pickup device to provide a vertical direction contour correcting signal, a gain adjust unit operable on the horizontal and vertical direction contour correcting signals to provide a gain-adjusted contour correcting signal, and compression means for separately compressing the luminance signal and the contour correcting signal;

a transmission path with band limitation for transmitting said luminance signal and said contour correcting signal compressed by said coding means; and decoding means for separately expanding said luminance signal and said contour correcting signal transmitted through said transmission path and for adding and outputting said signals.

2. An image processing system according to claim 1, wherein said coding means extracts positive and negative sign components and an absolute value component from said contour correcting signal when compression processing is carried out to said contour correcting signal, and compresses only said positive and negative sign components and said absolute value component.

3. An image processing system according to claim 1, wherein said gain adjust unit comprises coring means for carrying out core processing on the contour correcting signals and for supplying the gain-adjusted core processed contour correcting signals to said compression means.

4. A camera system, comprising:

an image pickup device with a color filter;

an optical system for taking in incident light from an object and for causing imaging on an image pickup surface of said image pickup device; and coding means for separating a signal provided by an image pickup device into a luminance signal and a contour correcting signal, said coding means including:

a horizontal low pass filter to provide said luminance signal, a first filter operable on said luminance signal to provide a horizontal direction contour correcting signal, a second filter operable on the signal derived from said image pickup device to provide a vertical direction contour correcting signal, a gain adjust unit operable on the horizontal and vertical direction contour correcting signals to provide a gain-adjusted contour correcting signal, and compression means for separately compressing the luminance signal and the contour correcting signal.

5. A camera system according to claim 4, wherein said coding means extracts positive and negative sign components and an absolute value component from said contour correcting signal when compression processing is carried out to said contour correcting signal, and compresses only said positive and negative sign components and said absolute value component.

6. A camera system according to claim 4, wherein said gain adjust unit comprises coring means for carrying out core processing on the contour correcting signals and for supplying the gain-adjusted core processed contour correcting signals to said compression means.

7. An image processing method, comprising the steps of:

separating a signal provided by an image pickup device into a luminance signal and a contour correcting signal by
  low pass filtering a signal derived from the image pickup device to provide said luminance signal,
  filtering the luminance signal to provide a horizontal direction contour correcting signal, filtering said signal derived from the image pickup device to provide a vertical direction contour correcting signal,
  gain adjusting the horizontal and vertical direction contour correcting signals to produce a gain-adjusted contour correcting signal and separately compressing the luminance signal and the contour correcting signal;

transmitting said luminance signal and said contour correcting signal through a transmission path which has band limitation and transmits said compressed luminance signal and said contour correcting signal; and separately expanding said luminance signal and said contour correcting signal transmitted through said transmission path, and adding and outputting said signals.

* * * * *